(No Model.)
B. F. GAGE.
COFFEE MAKING APPARATUS.
No. 514,592. Patented Feb. 13, 1894.
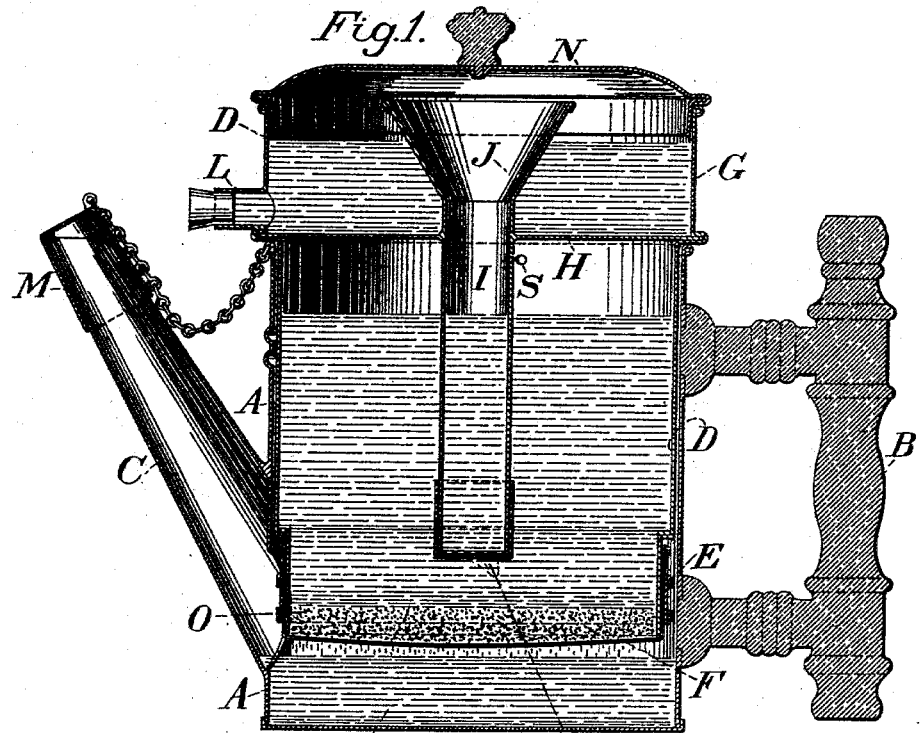
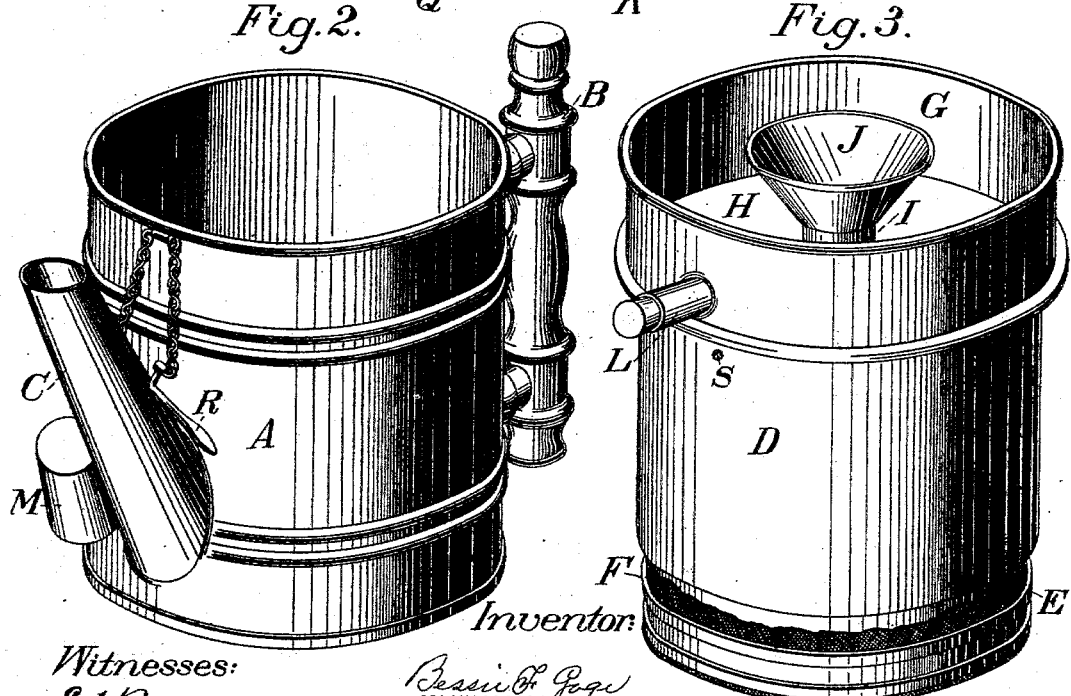
Witnesses:
E. A. Brandau
Wilson D. Bent, Jr.
Inventor:
Bessie F. Gage
by John Richards
Atty.
THE NATIONAL LITHOGRAPHING COMPANY,
WASHINGTON, D. C.

UNITED STATES PATENT OFFICE.

BESSIE F. GAGE, OF OAKLAND, CALIFORNIA.

COFFEE-MAKING APPARATUS.

SPECIFICATION forming part of Letters Patent No. 514,592, dated February 13, 1894.

Application filed March 9, 1893. Serial No. 465,346. (No model.)

*To all whom it may concern:*

Be it known that I, BESSIE F. GAGE, a citizen of the United States, residing in the city of Oakland, county of Alameda, State of California, have invented certain new and useful Improvements in Coffee-Making Apparatus; and I hereby declare the following specification and the drawings therewith to be a full, clear, and exact description of my improvements.

My invention relates to that class of vessels for making coffee, wherein the ground or triturated coffee is treated by percolation, and if desired, also by steeping, and to the retention and condensation of vapor given off during these processes.

My improvements consist in providing above the chamber in which the vapor is formed, an inclosed condensing vessel having a flat or horizontal bottom, and open communication by a central tube with the liquid beneath, so this vessel can be filled with water at a temperature low enough to condense such vapor and thus confine and retain the aroma of the coffee carried therein. This condenser being provided with a loose cover and an outlet for water at the bottom, so that its contents can be changed and cooled if necessary, without interfering with the contents of the main vessel.

Referring to the drawings—Figure 1 is a vertical section through a coffee preparing apparatus made according to my invention. Fig. 2 is a detail, showing in perspective the base or main containing vessel. Fig. 3 is another detail, also in perspective, showing the removable or percolating apparatus and condensing vessel combined.

Similar letters are employed to indicate corresponding parts in the different figures of the drawings.

The base or main vessel A is formed preferably of sheet metal, but can be of any suitable material, and is provided with a rigid handle B, of some non-conducting material of convenient form for lifting or decanting in the usual manner, a spout C, being provided for the discharge of the liquid coffee after its preparation.

The other main vessel D is made to slide within outer one A, as shown in Fig. 1, and has around its base a collar or band E for confining a cloth screen F, as shown in Fig. 3. Formed integrally with this vessel D is the condensing chamber G to contain cold water as will be hereinafter explained. Central in this vessel D, and attached to the diaphragm H is a tube I, having a funnel top J, and at its bottom a removable perforated cap K, for the escape of hot water poured in at the top. The condensing chamber G, is provided with a cover N and a discharge nipple L, so that if necessary the contents of this chamber can at any time be drawn off and replaced with water at a lower temperature. This condensing chamber being inclosed by a cover N, no vapor can rise and escape through the tube I, except such quantity as is condensed in the chamber G. A cap M, is provided to fit over the end of the spout C, so that no vapor can escape there during the time of preparing the coffee.

Referring now to the operation of my improved apparatus, the vessel D is inverted and the triturated coffee O, is poured in and rests on the diaphragm H. The screen F is then placed over the end of the vessel D, and the collar is pressed on, holding the screen firmly as a cover. This vessel D is again inverted and placed in the main vessel A, the coffee O falling down on the screen F, as shown in Fig. 1. The condensing chamber is then filled with cold water, the cap M placed on the spout C, and hot water is poured in at the funnel J, passing down the tube I, and escaping at the perforations K, falling on the coffee O percolates through and removes the essence therefrom, collecting in the bottom of the main vessel A at Q, as seen in Fig. 1. Steam or vapor rising from the prepared coffee in the bottom of the vessel A, passes up around the tube I, and comes in contact with the thin diaphragm H, and is there condensed as fast as formed by convection of the cold water in the chamber Q, is liquefied, and falls back again to the accumulated coffee in the bottom of the vessel A. This circulation goes on continually so long as the vessel is closed or until the strength is extracted from the coffee O. The vessel D is then raised and fastened if necessary, by a detent or wedge R, that can be inserted alongside the vessel D at the top of the vessel A, so as to hold the former at any desired height. The small perforation S is provided for the induction of air to replace the coffee poured out of the spout C, so the contents of the vessel and of the tube I will be drawn down into the vessel A. When this is complete, the strength of the coffee extracted, and when vapor ceases to rise, the vessel D and condenser G are removed, and the vessel A is covered in the usual manner by a close fitting cap, like the one N, and the coffee is ready to be decanted for use.

It will be seen that the main vessel A does not differ from those in common use, and that my improvements can be applied to any coffee pot of the general form shown.

Having thus described the nature and objects of my invention and the manner of applying the same, what I claim as new, and desire to secure by Letters Patent, is—

In a coffee preparing apparatus, the combination of the outer main vessel, the inner vessel sliding therein and having a screen bottom, a condensing chamber in the upper part of the inner vessel for containing cold water, said condensing chamber having a horizontal diaphragm for its bottom and having also a removable cover, and a vertical tube supported centrally in said horizontal diaphragm, having its upper open mouth-end located entirely within the condensing chamber and not communicating with the external atmosphere after said chamber is closed, and having its lower portion beneath the diaphragm, of equal diameter throughout and provided with a perforated cap, all substantially as described.

In testimony whereof I have hereunto affixed my signature in the presence of two witnesses.

BESSIE F. GAGE.

Witnesses:
GEO. E. DE GOLIA,
A. J. TREAT.